US012756079B2

(12) United States Patent
Lee

(10) Patent No.: US 12,756,079 B2
(45) Date of Patent: Oct. 6, 2026

(54) LITHIUM SECONDARY BATTERY INTO WHICH ELECTROLYTIC SOLUTION CAN BE ADDITIONALLY INJECTED

(71) Applicant: LG Energy Solution, Ltd., Seoul (KR)

(72) Inventor: Han Young Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 570 days.

(21) Appl. No.: 18/272,708

(22) PCT Filed: Nov. 23, 2022

(86) PCT No.: PCT/KR2022/018571
§ 371 (c)(1),
(2) Date: Jul. 17, 2023

(87) PCT Pub. No.: WO2023/096328
PCT Pub. Date: Jun. 1, 2023

(65) Prior Publication Data
US 2024/0079752 A1 Mar. 7, 2024

(30) Foreign Application Priority Data
Nov. 24, 2021 (KR) ........................ 10-2021-0163410

(51) Int. Cl.
*H01M 50/682* (2021.01)
*H01M 10/052* (2010.01)
*H01M 10/058* (2010.01)
*H01M 50/609* (2021.01)

(52) U.S. Cl.
CPC ....... *H01M 50/682* (2021.01); *H01M 10/052* (2013.01); *H01M 10/058* (2013.01); *H01M 50/609* (2021.01); *H01M 2200/10* (2013.01)

(58) Field of Classification Search
None
See application file for complete search history.

(56) References Cited

U.S. PATENT DOCUMENTS 8,652,668 B2 2/2014 Watanabe et al.
10,916,820 B2 2/2021 Kim et al.
2011/0108134 A1* 5/2011 Nishimura ............ H01M 10/05 137/260

(Continued)

FOREIGN PATENT DOCUMENTS

JP H10241738 A 9/1998
JP 200976249 A 4/2009

(Continued)

OTHER PUBLICATIONS

International Search Report for Appplication No. PCT/KR2022/018571 mailed Mar. 2, 2023. 3 pages.

(Continued)

*Primary Examiner* — Wyatt P McConnell
(74) *Attorney, Agent, or Firm* — Lerner David LLP

(57) ABSTRACT

A lithium secondary battery includes: an electrolyte replenishing unit filled with a preliminary electrolyte inside a packaging member; and a rupture member disposed adjacent to the electrolyte replenishing unit. The rupture member is deformed by a temperature change to form a hole in the packaging member so that the preliminary electrolyte inside the electrolyte replenishing unit can be injected.

17 Claims, 4 Drawing Sheets

(56) References Cited

U.S. PATENT DOCUMENTS

| | | | | |
|---|---|---|---|---|
| 2018/0090728 | A1 | 3/2018 | Song | |
| 2018/0159112 | A1 | 6/2018 | Chung et al. | |
| 2019/0006635 | A1* | 1/2019 | Kim .................... | H01M 10/056 |
| 2020/0127248 | A1 | 4/2020 | Kim et al. | |
| 2023/0109116 | A1 | 4/2023 | Park et al. | |

FOREIGN PATENT DOCUMENTS

| | | | |
|---|---|---|---|
| JP | 2012243672 | A | 12/2012 |
| JP | 2018143531 | A | 9/2018 |
| KR | 20050120465 | A | 12/2005 |
| KR | 20110106527 | A | 9/2011 |
| KR | 20130038655 | A | 4/2013 |
| KR | 101313070 | B1 | 9/2013 |
| KR | 20130106796 | A | 9/2013 |
| KR | 20160133135 | A | 11/2016 |
| KR | 20170034330 | A | 3/2017 |
| KR | 20170140919 | A | 12/2017 |
| KR | 20180023706 | A | 3/2018 |
| KR | 20180062826 | A | 6/2018 |
| KR | 101936074 | B1 | 1/2019 |
| KR | 20210135140 | A | 11/2021 |
| WO | 2021225237 | A1 | 11/2021 |

OTHER PUBLICATIONS

Extended European Search Report including Written Opinion for Application No. 22899010.7, dated Mar. 18, 2025, 7 pages.

* cited by examiner

[FIG. 1]
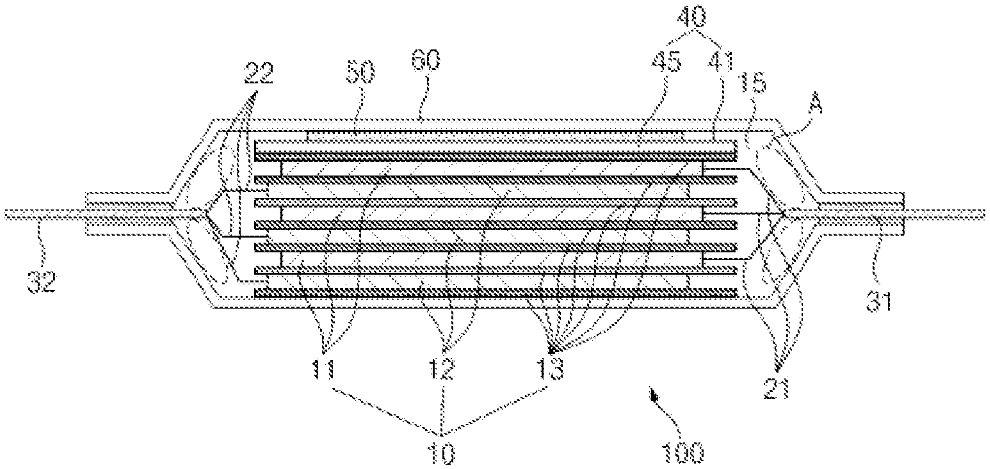
[FIG. 2]
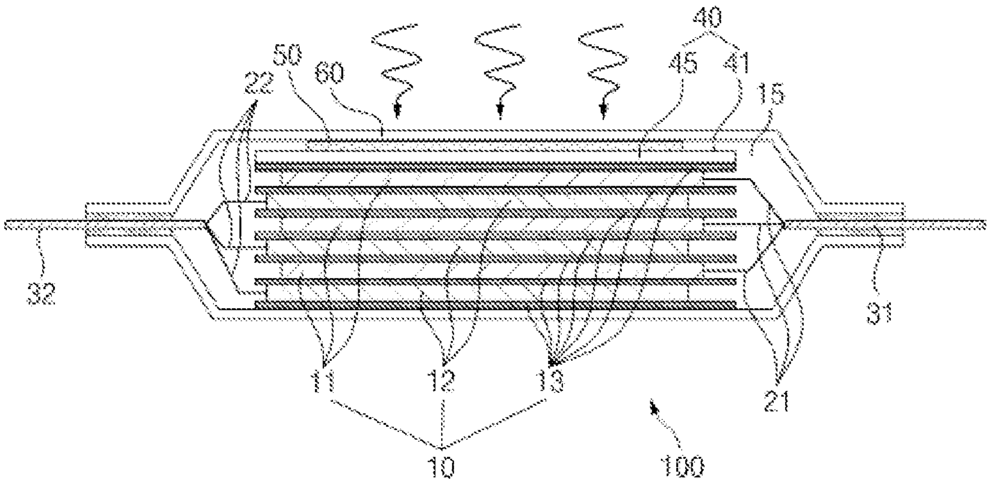

[FIG. 3]
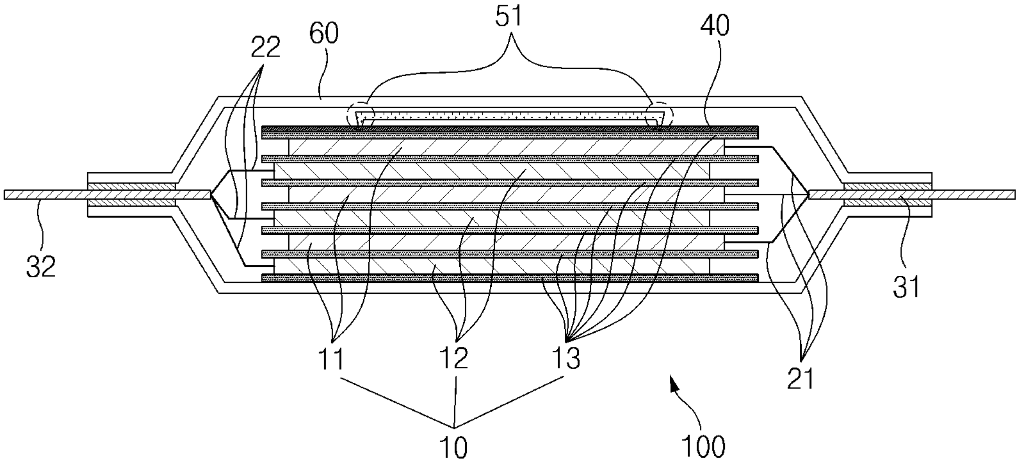
[FIG. 4]
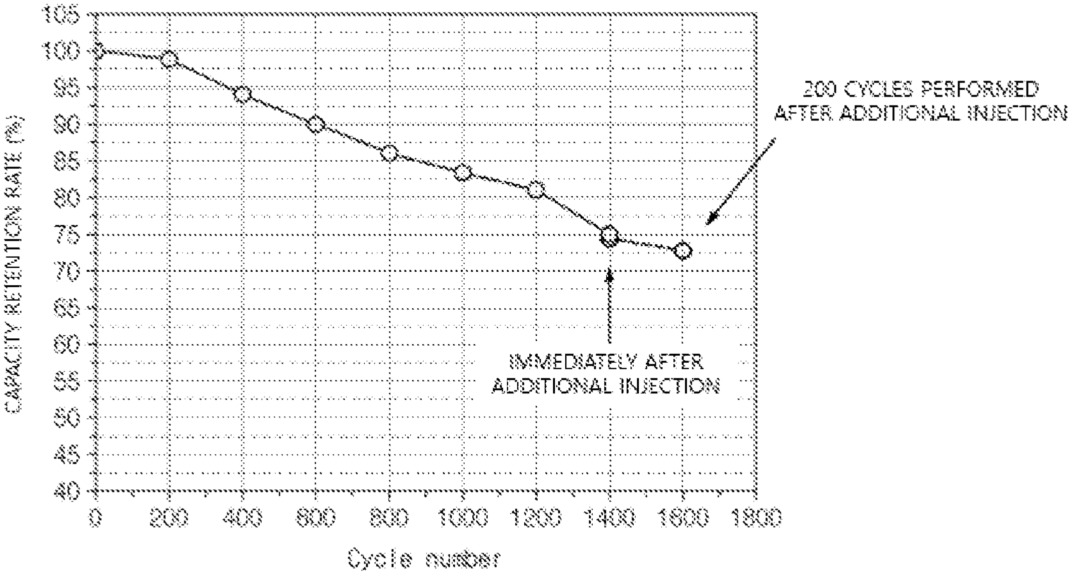

[FIG. 5]
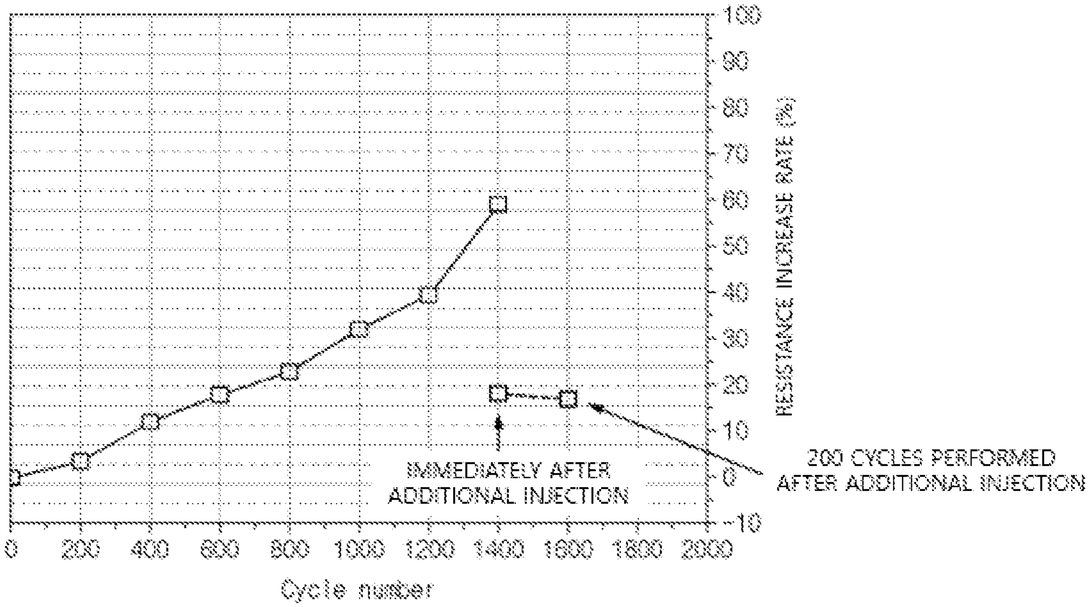

[FIG. 6]
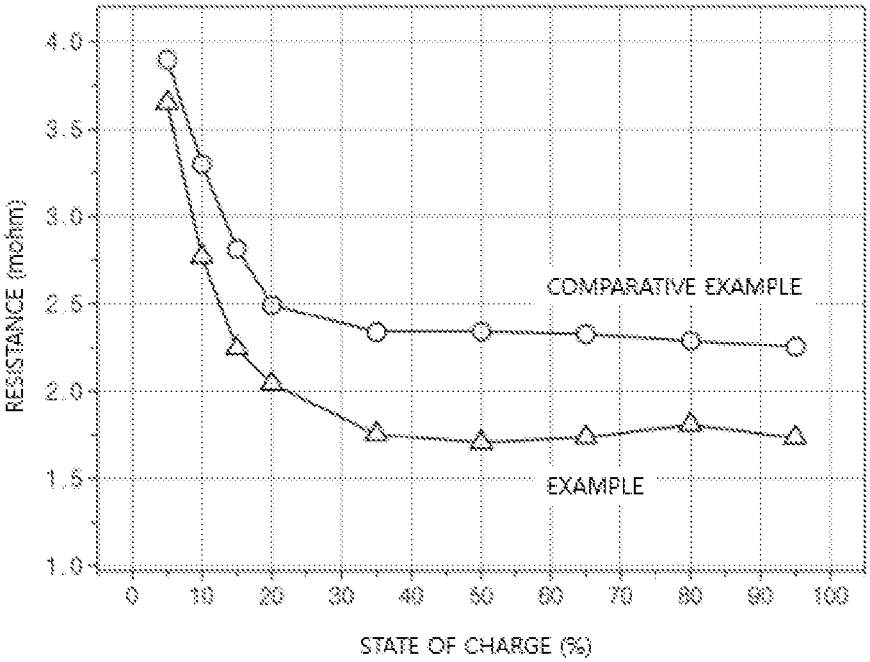

LITHIUM SECONDARY BATTERY INTO WHICH ELECTROLYTIC SOLUTION CAN BE ADDITIONALLY INJECTED

CROSS-REFERENCE TO RELATED APPLICATIONS

The present application is a national phase entry under 35 U.S.C § 371 of International Application No. PCT/KR2022/018571 filed on Nov. 23, 2022 which claims the benefit of priority based on Korean Patent Application No. 10-2021-0163410 filed on Nov. 24, 2021, all contents of which are incorporated herein by reference.

TECHNICAL FIELD

An aspect of the present invention relates to a lithium secondary battery capable of an additional electrolyte injection.

BACKGROUND TECHNOLOGY OF THE INVENTION

In general, a lithium secondary battery has a structure in which a separator is interposed between a positive electrode and a negative electrode as power generation elements, and a liquid electrolyte is injected between the elements.

A pouch-type battery that is commonly used is manufactured by accommodating an electrode assembly composed of a positive electrode/a separator/a negative electrode in a pouch-type battery case composed of a laminate sheet made of a polymer resin and an aluminum, coupling the upper laminate sheet to the lower laminate sheet in a state in which electrode leads are exposed to both ends of the battery case, and sealing through heat-compression.

Meanwhile, when the secondary battery is continuously charged and discharged, an electrolyte causes side reactions to bring denaturation, and the electrolyte inside the battery becomes insufficient, thereby reducing the lifespan of the secondary battery.

Since a cell case of a prismatic or a cylindrical lithium-ion secondary battery is made of a metallic material, the cell should be disassembled to inject an additional electrolyte. Due to cell disassembly, an electrode is oxidized in some cases when exposed to air, and there is a disadvantage in that it is difficult to reseal after an additional injection.

In order to replenish the electrolyte without disassembling the battery, Korean Open Patent Publication No. 10-2018-0023706 discloses a technology including a sealing member for additional electrolyte injection formed on a part of a battery case, so that an additional injection can be performed and a point of injection can be sealed after injecting the electrolyte into the electrolyte accommodating part of the battery case, but there are disadvantages in that the assembly process of the battery is complicated due to the sealing member, and that the electrolyte has to be injected for each battery.

Therefore, there is a need to develop a technology capable of additionally supplying an electrolyte in a safer and a more convenient way.

DESCRIPTION OF THE INVENTION

Technical Problem

The present disclosure is intended to solve the above conventional problems, and in order to extend the lifespan of the secondary battery, the present disclosure is directed to provide a lithium-ion secondary battery having a novel structure capable of supplying an additional electrolyte when a cell becomes degraded.

Technical Solution

To achieve the above purpose, the lithium secondary battery according to an exemplary embodiment of the present invention includes: an electrolyte replenishing unit filled with a preliminary electrolyte inside a packaging member; and a rupture member disposed adjacent to the electrolyte replenishing unit and may be deformed by a temperature change to form a hole in the packaging member so that the preliminary electrolyte inside the electrolyte replenishing unit can be injected.

In the lithium secondary battery according to an exemplary embodiment of the present invention, the packaging member may be a pouch-type made of a thermoplastic synthetic resin film.

In the lithium secondary battery according to an exemplary embodiment of the present invention, the packaging member may be made of a polyethylene resin film.

In the lithium secondary battery according to an exemplary embodiment of the present invention, the electrolyte replenishing unit and the rupture member may be disposed adjacent to an upper surface or a lower surface of the battery case by being stacked on the electrode assembly.

In the lithium secondary battery according to an exemplary embodiment of the present invention, the electrolyte replenishing unit and the rupture member may be disposed in the battery case sidewall of a dead space near the end of the electrode assembly.

In the lithium secondary battery according to an exemplary embodiment of the present invention, the rupture member may be disposed between the electrolyte replenishing unit and the battery case.

In the lithium secondary battery according to an exemplary embodiment of the present invention, the rupture member may be thermally deformed at a temperature of 80° C. to 120° C.

In the lithium secondary battery according to an exemplary embodiment of the present invention, the rupture member may be a shape-memory alloy.

In the lithium secondary battery according to an exemplary embodiment of the present invention, the rupture member may be a bimetal.

In the lithium secondary battery according to an exemplary embodiment of the present invention, the rupture member may be bonded to the electrolyte replenishing unit, and a weak part may be formed in the packaging member along the edge direction of the rupture member.

In the lithium secondary battery according to an exemplary embodiment of the present invention, the preliminary electrolyte may not include an additive for SEI film formation.

In the lithium secondary battery according to an exemplary embodiment of the present invention, the battery case may be a cylindrical metal can or a prismatic metal can.

The lithium secondary battery electrolyte replenishment method according to an exemplary embodiment of the present invention includes a step of applying heat to the lithium secondary battery to cause thermal deformation in the rupture member.

In the lithium secondary battery electrolyte replenishment method according to an exemplary embodiment of the present invention, the temperature at which heat is applied to the rupture member which may cause deformation may be 80° C. to 120° C.

Advantageous Effects

The lithium secondary battery according to an aspect of the present invention includes an electrolyte replenishing unit filled with a preliminary electrolyte in case of an electrolyte depletion, and includes a rupture member capable of forming a hole in the electrolyte replenishing unit by being deformed in a predetermined temperature range. Therefore, when capacity deterioration or rapid increase in resistance is observed as a result of repeated charging/discharging of the lithium secondary battery, the rupture member penetrates the surface of the electrolyte replenishing unit through heat treatment of the lithium secondary battery to further replenish the electrolyte inside the electrolyte replenishing unit, thereby having an effect of prolonging secondary battery lifespan.

In addition, the lithium secondary battery according to an aspect of the present invention has an advantage of not having to disassemble the secondary battery to replenish the electrolyte.

BRIEF DESCRIPTION OF THE DRAWINGS

FIG. 1 is a cross-sectional view illustrating a structure of a pouch-type secondary battery according to an exemplary embodiment of the present invention.

FIG. 2 is a cross-sectional view of an electrolyte depleted lithium secondary battery.

FIG. 3 is a cross-sectional view of a lithium secondary battery in which a preliminary electrolyte of an electrolyte replenishing unit is filled inside the battery.

FIG. 4 is a graph showing a capacity retention rate according to the number of cycles for a lithium secondary battery according to an exemplary embodiment of the present invention.

FIG. 5 is a graph showing a rate of increase in resistance according to the number of cycles for a lithium secondary battery according to an exemplary embodiment of the present invention.

FIG. 6 is a graph showing resistance according to a state of charge for a lithium secondary battery according to an exemplary embodiment of the present invention and for a secondary battery according to a comparative example.

REFERENCE NUMERALS

100: LITHIUM SECONDARY BATTERY
10: ELECTRODE ASSEMBLY
11: POSITIVE ELECTRODE PLATE
12: NEGATIVE ELECTRODE PLATE
13: SEPARATOR
21: POSITIVE ELECTRODE LEAD, 22: NEGATIVE ELECTRODE LEAD
31: POSITIVE ELECTRODE TAB, 32: NEGATIVE ELECTRODE TAB
40: ELECTROLYTE REPLENISHING UNIT
50: RUPTURE MEMBER
60: BATTERY CASE
A: DEAD SPACE

DETAILED DESCRIPTION

Since the present invention can apply various modifications and have various embodiments, specific embodiments will be exemplified and described in detail in the description. However, it should be understood that the present invention is not limited to specific embodiments, and includes all modifications, equivalents or alternatives within the spirit and technical scope of the present invention.

The terms used in the present disclosure are only used to describe specific embodiments, and are not intended to limit the present invention. Singular expressions include plural expressions unless the context clearly dictates otherwise. The terms “comprise” or “have” used herein to designate the presence of characteristics, numbers, steps, actions, components or members described in the specification or a combination thereof, and it should be understood that the possibility of the presence or addition of one or more other characteristics, numbers, steps, actions, components, members or a combination thereof is not excluded in advance.

The lithium secondary battery of an embodiment of the present invention includes an electrode assembly and a main electrolyte inside a battery case.

An electrode assembly is a power generation element capable of charging and discharging with a laminated structure of a positive electrode/a separator/a negative electrode. It may be any one of a folding type electrode assembly (jelly-roll) in which an active material-coated long sheet-type positive electrode and negative electrode are wound with a separator interposed therebetween, a stack type electrode assembly in which multiple positive electrodes and negative electrodes having a predetermined size are stacked in order with a separator interposed therebetween, a stack/folding type electrode assembly, a stack/lamination type electrode assembly, etc.

The battery case may be a cylindrical metal can, a prismatic metal can, or a pouch-type battery case made of an aluminum laminated sheet.

FIG. 1 is a cross-sectional view illustrating a structure of a lithium secondary battery according to an exemplary embodiment of the present invention. It illustrates a pouch-type lithium secondary battery having a form in which a stack type electrode assembly is embedded in a pouch-type battery case made of an aluminum laminated sheet.

The lithium secondary battery 100 according to an embodiment of the present invention includes: a battery case 60 accommodating an electrode assembly 10 and the electrode assembly 10; an electrolyte replenishing unit 40 filled with a preliminary electrolyte 45 inside a packaging member 41; and a rupture member 50 disposed adjacent to the electrolyte replenishing unit 40 and deformed by a temperature change to form a hole in the packaging member 41 so that the preliminary electrolyte 45 inside the electrolyte replenishing unit 40 can be injected.

In one specific example, the electrode assembly 10 includes a positive electrode plate 11, a negative electrode plate 12, and a separator 13 interposed between the positive electrode plate 11 and the negative electrode plate 12. In addition, a positive electrode tab 31 is formed on one side of the positive electrode plate 11, and a negative electrode tab 32 is formed on one side of the negative electrode plate 12, and the positive electrode tab and the negative electrode tab may be arranged side by side at regular spacings. The tabs may be connected to an external circuit by being connected to the positive electrode lead 21 and the negative electrode lead 22, respectively.

In addition, the electrode assembly 10, the positive electrode lead 21, and the negative electrode lead 22 are sealed by a pouch-type battery case 60. The pouch-type battery case 60 is conventionally a laminated sheet composed of an inner coating layer/a metal layer/an outer layer. By heating and pressurizing a to-be-sealed portion of the upper case and the lower case using a sealing member, inner coating layer of each of the upper case and the lower case is heat-sealed, and thus the inside is sealed. Here, in order to electrically connect the electrode assembly 10 to the outside, part of the positive electrode lead 31 and the negative electrode lead 32 may be sealed by the battery case while being exposed to the outside.

The lithium secondary battery 100 further includes a main electrolyte 15 in the inside, and the main electrolyte 15 may be an aqueous electrolyte or a non-aqueous electrolyte. The aqueous electrolyte may include water and a lithium salt as solvents, and the non-aqueous electrolyte may include a non-aqueous solvent and lithium salt as solvents.

The non-aqueous solvent may be used without particular limitation as long as it can serve as a medium through which ions involved in the electrochemical reaction of the battery can move through. Specifically, as the non-aqueous solvent, ester-based solvents such as methyl acetate, ethyl acetate, f-butyrolactone, and s-caprolactone; ether-based solvents such as dibutyl ether or tetrahydrofuran; ketone-based solvents such as cyclohexanone; aromatic hydrocarbon-based solvents such as benzene, fluorobenzene, etc.; carbonate-based solvents such as dimethylcarbonate (DMC), diethylcarbonate (DEC), methylethylcarbonate (MEC), ethylmethylcarbonate (EMC), ethylene carbonate (EC), propylene carbonate (PC), etc. may be used.

Among the above, carbonate-based solvents are preferred, and cyclic carbonates (e.g., ethylene carbonate or propylene carbonate, etc.) having high ionic conductivity and high dielectric constant capable of increasing the charging/discharging performance of the battery, and a mixture of a low-viscosity linear carbonate-based compounds (e.g., ethyl methyl carbonate, dimethyl carbonate, or diethyl carbonate, etc.) are more preferable.

The lithium salt may be used without particular limitation as long as it is a compound capable of providing lithium ions used in the lithium secondary battery. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$, etc. can be used. The lithium salt is preferably included in the main electrolyte 15 at a concentration of approximately 0.6 mol % to 2 mol %.

Besides the above constituents, for the purpose of improving the battery lifespan characteristics, suppressing the battery capacity decrease, and improving the battery discharge capacity, etc., the main electrolyte may further include one or more of additives such as pyridines, triethylphosphites, triethanolamines, cyclic ethers, ethylene diamines, n-glymes, hexaphosphoric acid triamides, nitrobenzene derivatives, sulfurs, quinone imine dyes, N-substituted oxazolidinones, N,N-substituted imidazolidines, ethylene glycol dialkyl ethers, ammonium salts, pyrroles, 2-methoxy ethanols, or aluminum trichlorides, etc.

In addition, in order to form a stable SEI (solid electrolyte interface) film on the surface of the negative electrode active material in the initial charging step, the main electrolyte solution 15 may include an additive for forming a SEI film such as VC (vinylene carbonate), FEC (fluoro ethylene carbonate), PS (propane sultone), ESA (ethylene sulfite). $LiBF_4$, etc.

The electrolyte replenishing unit 40 is for replenishing an insufficient electrolyte when the main electrolyte is depleted due to repeated charging and discharging of the lithium secondary battery, and it may have a configuration in which a preliminary electrolyte 45 is filled inside a pouch-shaped packaging member 41. However, the configuration of the electrolyte replenishing unit is not limited thereto.

The packaging member 41 of the electrolyte replenishing unit 40 is ruptured by a rupture member 50 to be described later when replenishment of the electrolyte is required, allowing the preliminary electrolyte 45 accommodated inside the packaging member 41 to replenish the depleted main electrolyte of the secondary battery.

In one specific example, the packaging member 41 may be made of a thermoplastic synthetic resin film, preferably made of a polyethylene resin film, because the polyethylene resin film can be easily ruptured by physical pressure.

It is preferable that the preliminary electrolyte solution 45 contained in the electrolyte replenishing unit 40 does not include an additive for forming a SEI film. Since the additive for forming a SEI film is added to form the SEI film during the initial charging, the additive for forming a SEI film is not required in the preliminary electrolyte for additional replenishment, and if the additive forming a SEI film is included, it can negatively affect the battery due to a decomposition reaction of its components.

FIG. 3 is a perspective view showing a structure of a lithium secondary battery according to an exemplary embodiment of the present invention. When the electrolyte replenishing unit 40 is formed in a form of a pouch, it can be formed with a large cross-sectional area similar to the electrode assembly 10, so there are advantages in that a sufficient amount of preliminary electrolyte can be contained, and the electrolyte replenishing unit can be formed to have a small thickness.

The rupture member 50 may be a thermally deformable member that is deformed by heat, and the thermally deformable member is preferably a shape-memory alloy or a bimetal.

A Shape-memory alloy refers to a metal that causes martensitic transformation, pseudoelasticity, or superelasticity transformation due to stress induction when heat is applied, and a typical example is a nickel-titanium alloy.

A bimetal is made by attaching two metals with different coefficients of thermal expansion, and based on the fact that each metal has a different coefficient of thermal expansion, it is a substance that has a property of bending to one side due to having a different degree of expansion depending on changes in temperature.

Among the two metals constituting the bimetal, the upper metal is preferably composed of a first metal having a small coefficient of thermal expansion, and the lower metal is preferably composed of a second metal having a larger coefficient of thermal expansion than that of the first metal. During the thermal expansion, the first metal expands relatively little and the second metal greatly expands relatively, so that the bimetal bends in one direction.

The rupture member 50 may be disposed adjacent to one side of the electrolyte replenishing unit, and this is because when the rupture member 50 is thermally deformed by the heat applied from the outside, and the thermally deformed end part 51 of the rupture member can apply physical pressure to form a hole in the electrolyte replenishing unit 40.

The rupture member 50 and the electrolyte replenishing unit 40 may simply have a laminated structure or a bonded structure. When the rupture member 50 and the electrolyte replenishing unit 40 have a simple laminated structure, it is preferable to form a hole by rupturing the packaging member 41 of the electrolyte replenishing unit 40 by the end of the rupture member 50, and in this case, it is preferable to form the end part 51 of the rupture member 50 to be sharp.

When the rupture member 50 and the electrolyte replenishing unit 40 are bonded together, the electrolyte may be easily leaked by forming a weak part (not illustrated) along the edge direction of the rupture member 50, so that the packaging member 41 may be destroyed along the weak part when the rupture member 50 is thermally deformed.

If a hole can be formed in the packaging member 41 of the electrolyte replenishing unit 40 by the rupture member 50, its shape and size are not particularly limited, and it is preferable to reduce the volume and the weight. In addition, the rupture member 50 is preferably interposed between the electrolyte replenishing unit 40 and the battery case 60 so that heat can be easily applied from the outside.

The rupture member is thermally deformed in a temperature range of 80° C. to 120° C., preferably 85° C. to 110° C. When thermal deformation of the rupture member occurs at a temperature lower than 80° C., unintended thermal deformation of the rupture member may occur during daily charging and discharging of a lithium secondary battery. When thermal deformation of the rupture member occurs at a temperature exceeding 120° C., since excessive heat must be applied to the lithium secondary battery to replenish the electrolyte, the battery may be deteriorated or the cycle characteristics of the battery may be adversely affected, resulting in thermal runaway, which is undesirable.

The electrolyte replenishing unit 40 and the rupture member 50 are disposed in a separation space A between the electrode assembly 10 and the battery case 60.

When the electrolyte replenishing unit 40 is formed with a packaging member 41 in a form of a pouch, it may be stacked on the electrode assembly 10 and disposed adjacent to the upper surface or the lower surface of the battery case 60. In this case, it is preferable because it is possible to efficiently apply heat to the rupture member 50 from the outside.

In addition, although not shown in the diagrams, the electrolyte replenishing unit 40 and the rupture member 50 may be interposed on a battery case 60 sidewall of a dead space A near the end of the electrode assembly 10. However, since the rupture member 50 may have conductivity and may cause an internal short circuit when the rupture member 50 having conductivity comes into contact with the electrode lead, in the case in which the rupture member 50 has conductivity, it is preferable that the electrolyte replenishing unit 40 and the rupture member 50 are stacked on the electrode assembly 10 and disposed adjacent to the upper surface or the lower surface of the battery case 60.

The electrolyte replenishing method of the lithium secondary battery according to an exemplary embodiment of the present invention may include a step of causing thermal deformation in the rupture member 50 by applying heat to the lithium secondary battery of an embodiment of the present invention.

FIG. 2 is a cross-sectional view of a lithium secondary battery in which an electrolyte is depleted, and FIG. 3 is a cross-sectional view of a lithium secondary battery in which a preliminary electrolyte of an electrolyte replenishing unit 40 is filled inside the battery.

As shown in FIG. 2, when the main electrolyte in the lithium secondary battery is depleted by continued charging and discharging, and as shown in FIG. 3, when the user applies heat to the outside at an appropriate time, the rupture member 50 becomes thermally deformed, and as a result, a hole is formed on the surface of the electrolyte replenishing unit 40, and the preliminary electrolyte 45 contained in the electrolyte replenishing unit 40 flows out and is injected into the battery.

Since the rupture member 50 is thermally deformed in the temperature range of 80° C. to 120° C. as described above, the temperature at which heat is applied is preferably in the range of 80° C. to 120° C.

As described above, when the battery performance is deteriorated due to depletion in the main electrolyte injected at shipment by repeated charging and discharging, the lithium secondary battery according to an embodiment of the present invention can prolong its lifespan by additionally injecting the preliminary electrolyte stored inside the electrolyte replenishing unit through a heat treatment.

In addition, since there is no need to disassemble the battery for additional injection of the electrolyte, it is more useful for a prismatic lithium secondary battery or a cylindrical lithium secondary battery to which a metallic can-shaped battery case is applied, which is difficult to disassemble the battery after manufacturing is completed.

Example

<Manufacture of Electrode Assembly>

A stack type electrode assembly was manufactured by stacking 8 basic units of a positive electrode-separator-negative electrode-separator.

<Preparation of Main Electrolyte>

Ethylene carbonate (EC):Ethylmethyl carbonate (EMC) was mixed at a volume ratio of 30:70, and in a non-aqueous organic solvent to which $LiPF_6$ is dissolved to a concentration of 1.0 M, 1.0 wt % of vinylene carbonate (VC) and 0.5 wt % of propanesultone (PS) were added as SEI film forming additives to prepare the electrolyte.

<Preparation of Electrolyte Replenishing Unit and Rupture Member>

As a preliminary electrolyte solution filled in the electrolyte replenishing unit, an electrolyte in which ethylene carbonate (EC):ethylmethyl carbonate (EMC) was mixed in a volume ratio of 30:70, and $LiPF_6$ was dissolved to a concentration of 1.0 M was prepared.

As a packaging member of the electrolyte replenishing unit, a pouch-type polyethylene resin film was prepared, and the preliminary electrolyte was filled into the packaging member and was sealed to manufacture the electrolyte replenishing unit.

As a rupture member, a shape-memory alloy that is thermally deformed at 90° C. and having an acicular distal end was prepared.

<Assembly of Secondary Battery>

As shown in FIG. 1, the electrode assembly, the electrolyte replenishing unit, and the rupture member were accommodated in a pouch-type battery case laminated with Polypropylene/Aluminum/Nylon, and the main electrolyte was injected to complete the manufacture of the secondary battery.

Comparative Example

According to the Comparative Example, during the assembly of the secondary battery, the electrolyte replenishing unit and the rupture member of the Example were not accommodated, but a secondary battery in which the electrode assembly and the main electrolyte of the Example were accommodated was manufactured.

Experimental Example 1: Capacity Retention Rate According to Charge/Discharge Cycles The secondary battery of the Example was charged under 0.33 C/4.2V constant current/constant voltage (CC/CV)

4.2V/0.05 C conditions at 25° C. and discharged at a constant current of 0.33 C/2.5V to measure the discharge capacity using PNE-0506 charger/discharger (manufacturer: PNE Solution Co., Ltd., 5V, 6 A). Here, the measured discharge capacity was defined as the initial capacity.

Charging and discharging were repeated 1400 times under the above charging and discharging conditions, and then the secondary battery was heated at a temperature of 90° C. to 100° C. for 10 minutes. Thereafter, charging and discharging were further repeated 200 times under the above charging and discharging conditions. The capacity retention rate according to the charge/discharge cycles was calculated by substituting into Equation 1 below, and the results were shown in FIG. 4.

Capacity Retention Rate (%)=(discharge capacity per cycle/initial capacity)×100    Equation 1:

Experimental Example 2: Resistance Increase Rate According to Charge/Discharge Cycles The secondary battery of the Example was charged under 0.33 C/4.2V constant current-constant voltage 4.2V/0.05 C conditions and discharged at 0.33 C using a PNE-0506 charger/discharger (manufacturer: PNE Solution Co., Ltd., 5V, 6 A) to adjust the state of charge for the battery to SOC 50%, and the resistance value was obtained by measuring the voltage drop in a state in which a discharge pulse was applied for 10 seconds at a constant current of 2.5 C. This was defined as the initial resistance.

Charging and discharging were repeated 1400 times under the above charging and discharging conditions, and then the secondary battery was heated at a temperature of 90° C. to 100° C. for 10 minutes. Thereafter, charging and discharging were repeated 200 times under the above charging and discharging conditions. The resistance increase rate (%) of the secondary battery was calculated from the ratio of the resistance according to the charge/discharge cycles, and this was shown in FIG. 5.

Resistance Increase Rate (%)={(resistance according to cycle−initial resistance)/initial resistance}×100    Equation 2:

Experimental Example 3: Resistance Measurement According to State of Charge after Long-Term Cycle Charging the secondary batteries of the Example and the Comparative Example at 25° C. under 0.33 C/4.2V constant current/constant voltage (CC/CV) 4.2V/0.05 C conditions and then discharging under 0.33 C/2.5V constant current conditions was set as one cycle, and such charging and discharging were repeated 1400 times.

The secondary battery of the Example was heated for 10 minutes at a temperature of 90° C. to 100° C. The heating process was not performed on the secondary battery of the Comparative Example.

Thereafter, the secondary batteries of the Example and the Comparative Example were adjusted to a charging state as much as 5% of the state of charge (SOC) by charging under 0.33 C/4.2V constant current-constant voltage 4.2V/0.05 C conditions and discharging at 0.33 C. After that, the resistance value was obtained by measuring the voltage drop in a state in which a discharge pulse was applied for 10 seconds at a constant current of 2.5 C. At the points where the state of charge is 10%, 15%, 20%, 35%, 50%, 65%, 80%, and 95%, each resistance value was measured in the same way as above, and the results were shown in FIG. 6.

Referring to FIG. 4, as the charge/discharge cycles of the lithium secondary battery progress, the battery degrades and the capacity retention rate continuously decreases, and especially at 1200 to 1400 cycles, the capacity retention rate drops from 83% to 75%, so it can be seen that the deterioration of the battery intensities in the corresponding section.

Referring to FIG. 5, as the charge/discharge cycles of the lithium secondary battery progress, the resistance of the lithium secondary battery continuously increases, and especially at 1200 to 1400 cycles, the resistance greatly increases from 40% to 59% compared to the initial resistance, and this is presumed to be due to depletion of the electrolyte inside the lithium secondary battery and deterioration of the active material. However, in the lithium secondary battery according to an embodiment of the present invention, since the electrolyte is additionally injected by the electrolyte replenishing unit at the 1400th cycle, the slope of the capacity retention rate decreased in the subsequent charge/discharge cycles, the resistance increase rate rapidly decreased from 59% to approximately 18%, and no increase in resistance was observed even after performing additional charging and discharging for the subsequent 200 cycles.

Referring to FIG. 6, the lithium secondary battery according to the Comparative Example showed greater cell resistance at all state of charge than that of the lithium secondary battery according to the Example.

As described above, when deterioration is observed, the secondary battery according to an embodiment of the present invention can additionally inject an electrolyte by causing a rupture on the surface of the electrolyte replenishing unit through a high-temperature heat treatment, and accordingly, battery lifespan can be extended.

The invention claimed is:

1. A lithium secondary battery, accommodating an electrode assembly and a main electrolyte disposed inside a battery case, comprising:
- an electrolyte replenishing unit filled with a preliminary electrolyte disposed inside a packaging member; and
- a rupture member disposed adjacent to the electrolyte replenishing unit and configured to be deformed by a temperature change to form a hole in the packaging member, so that the preliminary electrolyte disposed inside the electrolyte replenishing unit can be injected.

2. The lithium secondary battery of claim 1, wherein
- the packaging member is a pouch-type form including a thermoplastic synthetic resin film.

3. The lithium secondary battery of claim 2, wherein
- the packaging member includes a polyethylene resin film.

4. The lithium secondary battery of claim 1, wherein
- the electrolyte replenishing unit and the rupture member are disposed in a separation space between the electrode assembly and the battery case.

5. The lithium secondary battery of claim 1, wherein
- the electrolyte replenishing unit and the rupture member are disposed adjacent to an upper surface of the battery case, wherein the electrolyte replenishing unit and the rupture member are stacked on the electrode assembly.

6. The lithium secondary battery of claim 1, wherein
- the electrolyte replenishing unit and the rupture member are disposed in a dead space of a battery case sidewall, so as to be disposed between the battery case sidewall and an end of the electrode assembly.

7. The lithium secondary battery of claim 4, wherein
- the rupture member is disposed between the electrolyte replenishing unit and the battery case.

8. The lithium secondary battery of claim 1, wherein the rupture member is configured to be thermally deformed at a temperature in a range of 80° C. to 120° C.

9. The lithium secondary battery of claim 1, wherein the rupture member is a shape-memory alloy.

10. The lithium secondary battery of claim 1, wherein the rupture member is a bimetal.

11. The lithium secondary battery of claim 1, wherein the rupture member is joined to the electrolyte replenishing unit, and a failure part is included in the packaging member along an edge direction of the rupture member, wherein the packaging member is configured to rupture along the failure part.

12. The lithium secondary battery of claim 1, wherein the preliminary electrolyte does not comprise an additive for a SEI film formation.

13. The lithium secondary battery of claim 1, wherein the battery case is a cylindrical metal can.

14. A lithium secondary battery electrolyte replenishment method comprises:

applying heat to the lithium secondary battery of claim 1 to cause thermal deformation in the rupture member.

15. The method of claim 14, wherein a temperature at which heat is applied to the rupture member is 80° C. to 120° C.

16. The lithium secondary battery of claim 1, wherein the battery case is a prismatic metal can.

17. The lithium secondary battery of claim 1, wherein the electrolyte replenishing unit and the rupture member are disposed adjacent to a lower surface of the battery case, wherein the electrolyte replenishing unit and the rupture member are stacked on the electrode assembly.

* * * * *